¡United States Patent Office 2,955,691
Patented Oct. 11, 1960

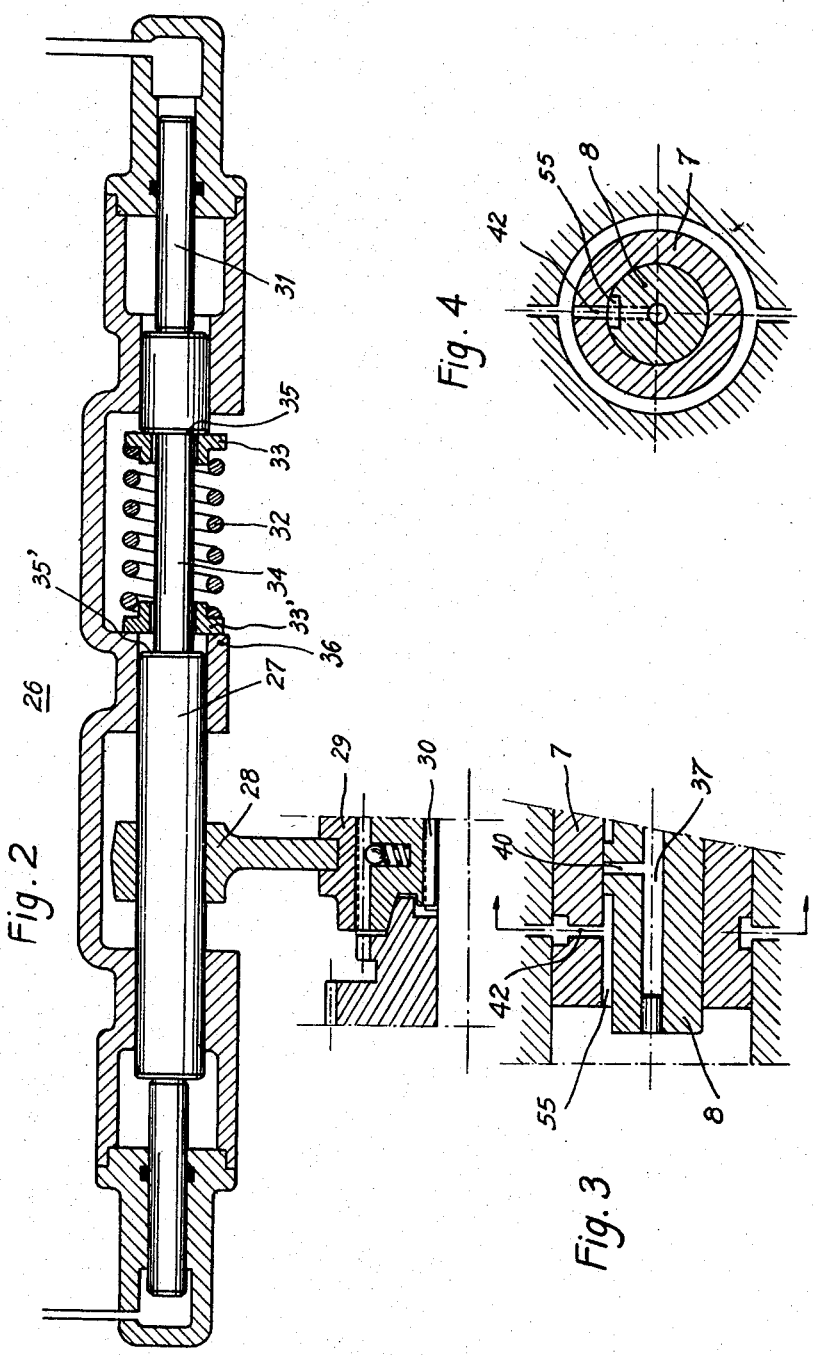

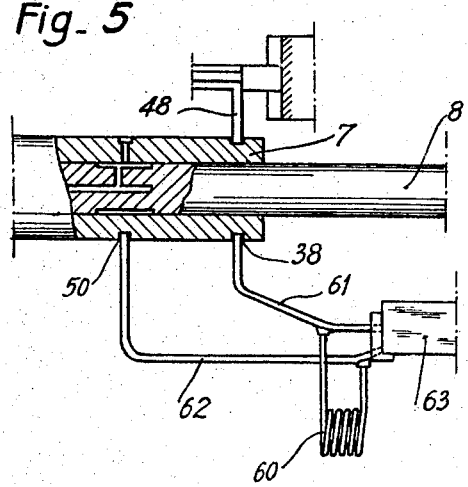
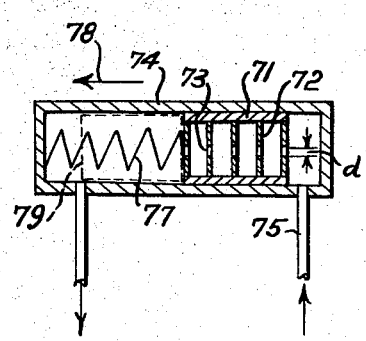
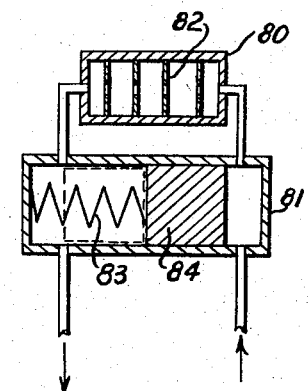
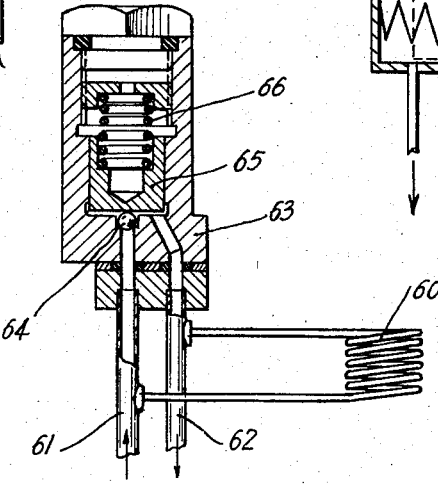

2,955,691

HYDRAULIC CONTROL DEVICES FOR CHANGING SPEEDS IN TRANSMISSION SYSTEMS

Antoine Brueder, Paris, France, assignor to Societe Anonyme Andre Citroen, Paris, France, a corporation of France Filed Feb. 13, 1956, Ser. No. 565,221

Claims priority, application France February 15, 1955

11 Claims. (Cl. 192—3.5)

The present invention has for its object the provision of a semi-automatic or automatic actuation and control for a gear-changing and clutch operation, especially for automobile transmissions.

The devices in accordance with this invention are applicable to vehicles provided with gear boxes with sliding gears or gear-boxes with planetary gears on the one hand, and a friction clutch on the other hand.

These devices are particularly characterised by their simplicity, complete safety of operation, and rapidity of action, combined with a perfect synchronisation of the pinions.

In accordance with the invention, a device for co-operating with a gear-box and a clutch of conventional type is formed by a rotating and sliding distributor actuated by the driver, by a clutch slide-valve acting automatically so as to effect de-clutching during a change in position of the rotating distributor, by a series of elastic chambers permitting of a progressive increase in the pressure during the time of synchronisation of the gears, by a series of small pistons which automatically push the clutch slide-valve when the members which correspond to the new speed selected are brought into action, by pistons acting on the spindles of the forks of the gear-box, and by an elastic system which restores these forks to neutral position.

A device in accordance with the invention will next be described by way of invention, reference being made to the appended drawings, in which:

Fig. 2 shows the detail of the gear-box, the spindle of the fork being in the position which it takes up during the synchronisation of the gears.

Figs. 3 and 4 show details of the extremity of the gear-changing slide-valve.

Fig. 5 shows a pressure-limiting device which can be added to the slide-valve used as a pre-selector of gears.

Fig. 6 is a longitudinal cross-section of the pressure-limiting valve for an alternative form in accordance with Fig. 5.

Fig. 7 is a longitudinal cross-section of a flow-regulating device which can be added to the slide-valve gear pre-selector.

Fig. 8 is an alternative form of the device shown in Fig. 7.

Figure 1:
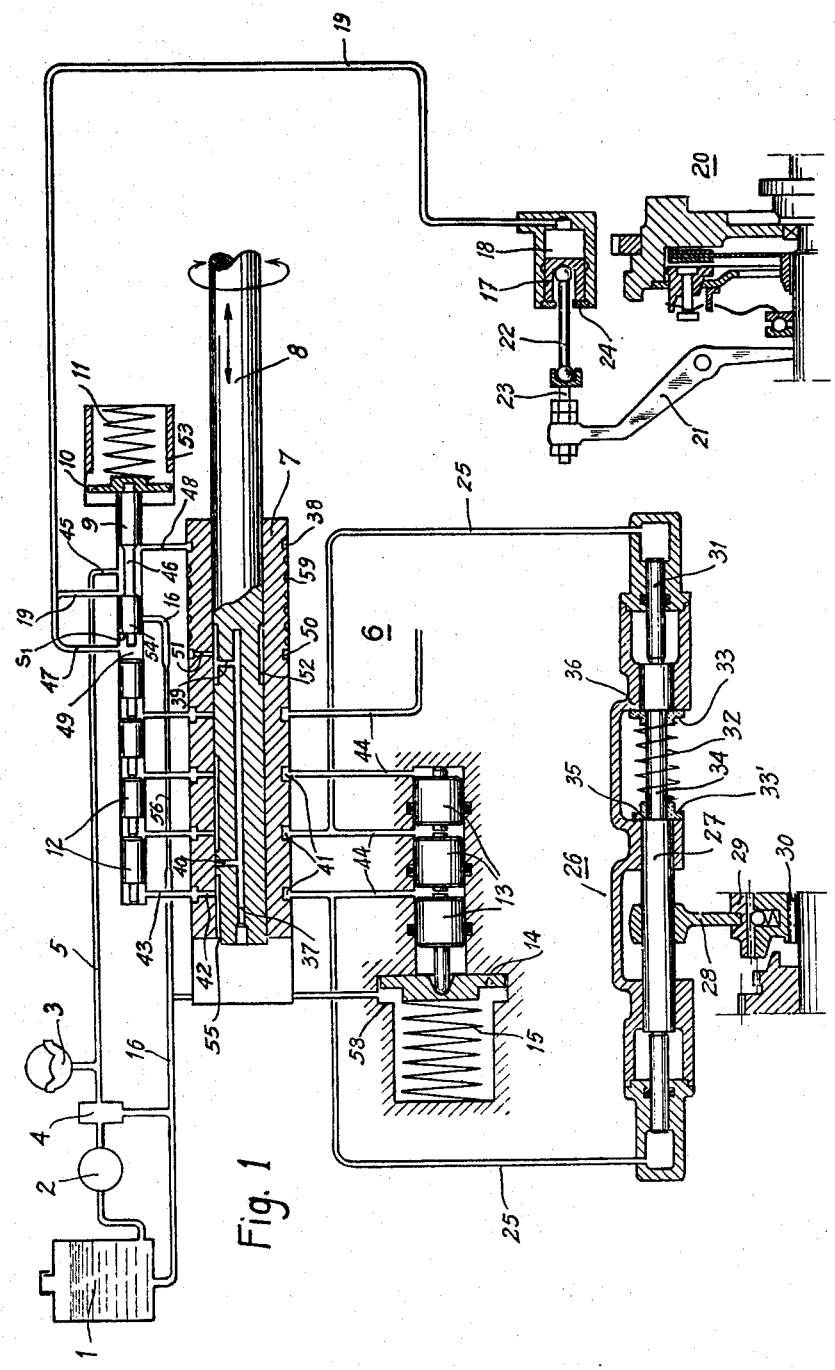
Fig. 1 shows the general arrangement diagram of the hydraulic combination for gear-changing. The apparatus is shown in the neutral position, and with the clutch disengaged.

A hydraulic control device for gear-changing in accordance with the invention comprises as a whole:

(a) A source of fluid under pressure which fluid may, for example, be oil.

(b) A distributor unit comprising servo-motors which control the de-clutching operations, the changing of gears and the re-engagement of the clutch.

(c) Pistons which actuate the spindles of the forks in the case of a gear-box having sliding gears, or acting on particular clutches in the case of a gear-box with planetary gears.

(d) A piston which effects, directly or through the intermediary of a lever, the gripping or the release of the mechanism of a friction clutch.

Referring now to Fig. 1 which shows the diagrammatic arrangement of the general system of the device, the liquid contained in the reservoir 1 is drawn into a pressure pump 2 and is then delivered to an oleo-pneumatic accumulator 3 which maintains a reserve supply of liquid at a practically constant pressure by means of a connecting and disconnecting device 4 interposed between the pump 2 and the accumulator 3. From accumulator 3, a conduit system 5 supplies the distributor unit indicated as a whole at 6 with liquid under pressure. This distributor unit is made up of the various devices as follows: a jacket 7 which receives a slide-valve 8, which will hereinafter be termed the "gear pre-selector," and which, in the embodiment shown, is capable of both a lateral and a rotary movement by manual operation (from the gear-changing lever) or by automatic control (by the automatic selector), a slide-valve 9 supported on a member 10 which is itself acted on by a spring 11, this device being hereinafter known as the "indicator for gear-changing and for disengagement and re-engagement of the clutch," small pistons 12 which constitute an auxiliary distributor and which are arranged alongside each other and the number of which corresponds to the number of ratios of the gear-box, the function of which is coupled with that of the slide-valve 9; and pistons 13 arranged along side each other and the number of which corresponds to the number of synchronised ratios of the gear-box, one of the pistons 13 being supported on a member 14 controlled by a spring 15, which device will be subsequently known as the "elastic chamber," and the function of which will be to ensure and to permit of synchronisation.

This assembly of devices is connected, on the one hand to the liquid tank 1 through a conduit 16 which provides for the exhaust of the liquid, and on the other hand through a conduit 19 to a de-clutching system 17 located in a cylinder 18; this piston 17 acts on the mechanism of a friction clutch 20 of standard type, by acting on a lever 21 through the medium of a crank-arm 22 and a swivel screw 23 which are provided to take up wear in the clutch, the piston determining the de-clutching travel once and for all by coming up against the stop 24.

Finally, through a group of conduits 25, the number of which corresponds to the number of ratios of the gear-box, the assembly is coupled to a gear-control system, represented in this case by a cover 26 for the gear-box, fitted with fork spindles 27, these fork spindles being adapted to drive, through the medium of the forks 28, sliding positive clutch elements 29 of standard type which can themselves engage with pinions, or may also be grouped with systems of synchronisers and dogs 39 as shown in the drawing.

In this example of a control for a gear-box, the fork spindles 27 are displaced laterally by the action of push-rods 31 actuated by the pressure obtaining at the moment in the conduits 25, the return of the fork spindles 27 to the neutral point being effected by the action of springs 32 which are supported on dished members 33 and 33' which slide on the reduced portion 34 machined on the fork spindles. These members are themselves supported in neutral position, on the one hand against the shoulders 35 formed on the fork spindles, and on the other hand against the bearings 36 of the gear-box cover.

Fig. 2 shows a unit of this kind in the "synchronisation position"; a piston 31 subjected to pressure has displaced the fork spindle 27, which has compressed the spring 32 through the medium of the member 33 supported against the shoulder 35, the other member 33' remaining in position since it is supported against the face of the bearing 36.

In the neutral position, the spring 32 is strongly compressed, this requiring an initial pressure from the neutral position, when it is desired to change a gear; the return to the neutral position is thus effected very powerfully and positively for the same reason (as has been previously indicated, an identical system could be designed to control for example the band-brakes in a gear-box provided with planetary gears).

The operation of this device is as follows:

It will first of all be assumed that the system is in the neutral position, the gear-pre-selector slide-valve 8 comprising at its center a conduit 37 which is coupled, on the one hand to a circular groove 52 by means of a conduit 39, and on the other hand by means of various conduits 40, which, by their arrangement, may be put singly in connection with the circular grooves 41, the number of which corresponds to the number of ratios of the gear-box, through the conduits 42; these grooves are in communication with the pistons 13 and the pistons 12 through the conduits 44 and 43, and with the pistons 31, controlling the displacements of the fork spindles 27, through the conduits 25. In the neutral position, the slide-valve 8 has a position such that no coupling is possible between the conduits 40 and the grooves 41, none of the conduits 42 being placed in correspondence with the conduits 40, and the conduits 42 opening into the bore in which is fitted the slide-valve 8.

Assuming that the initial position is the neutral position and that there is no pressure inside the accumulator 3, when the pump 2 is put into action, a pressure is immediately set up in the accumulator 3 and also in the conduit 5 which supplies liquid under pressure to the distributor unit 6, a conduit 45 enables the pressure to be established inside the groove 46 of the slide-valve 9. Before the pressure of the system has risen, the slide-valve 9 is held supported by the small pistons 12 due to the thrust applied by the dished member 10 under the action of the spring 11. In this position, the groove 46 puts the conduit 45 into communication with the circuit 19 passing to the de-clutching cylinder 18, while in this position the conduits 48 and 16 are closed. The pressure is thus transmitted to the de-clutching piston 17 which effects the release of the clutch 20.

The de-clutching pressure is also transmitted to the chamber 49 through the conduit 47; this pressure acts on the face $S_1$ of the slide-valve 9 in opposition to the spring 11, and when the pressure acting on $S_1$ balances the force of the spring 11, the slide-valve 9 is displaced in such manner that the piston 54 closes the conduit 19 but the width of the groove 46 is slightly greater than the distance A which separates the conduits 19 and 48, with the result that the liquid under pressure is obliged to pass into the conduit 48 at the moment at which the de-clutching pressure has reached the desired value.

The conduit 48 puts the groove 46 into communication with a circular groove 38 formed round the jacket 7, and spiral groove 59 of small section leads from the groove 38 into a further circular groove 50 which communicates with the central bore 37 of the slide-valve 8 through the conduit 51, the groove 52 and the other conduit 39.

When the slide-valve 8 is displaced in order to produce the engagement of a synchronised gear, a conduit 40 is moved opposite a conduit 42; at that moment, there are in direct or indirect coupling: the piston 31 which actuates the fork spindle 27 through the conduit 25, an elastic chamber, that is to say a piston 13 through a conduit 44 and finally a piston 12 through a conduit 43, the whole being fed through a groove 41.

It has been explained above how the pressure is admitted to the conduit 48 after declutching has been effected; now this conduit is put into use by the operation which has been described above, for a gear-changing operation, and the pressure is thus immediately transmitted through the conduit system: conduit 48, spiral conduit 59, radial conduit 51, groove 52, conduit 39, central conduit 37, and conduits 40 and 42 to the conduits 25, 44 and 43. As the gear-box was previously in the neutral position, there was no pressure in these conduit systems; the pressure now rises inside these three conduits. Under the effect of this pressure, the movement of the various members is effected in the following order:

The piston 31 first of all pushes the fork spindle 27 which puts the ring of the synchroniser 30 in contact with the corresponding cone, through the intermediary of the fork 28 and the sliding-gear 29. At this moment, the pressure begins to move the piston 13 corresponding to the gear to be engaged, this piston progressively compresses the spring 15 until the dished member 14 is moved into abutment with the shoulder 58, by virtue of the limited flow of the liquid under pressure which passes through the spiral groove 59 of the jacket 7.

This enables the engagement of the gear to be synchronised; in effect, the ring and the cone of the synchroniser 30 have their load increased without thereby being moved (due to the fact that the ball of the synchroniser 30 cannot disengage and permit of engagement), until the moment at which the pressure acting on the piston 31, which is at all times the same as that obtaining under the piston 13, can reach the value required to disengage the ball. At that moment, the piston 13 which has compressed the spring 15, moves back rapidly and enables engagement to take place immediately after the freeing of the ball. The desired pinions of the gear-box are then in engagement.

When the piston 13, which had moved back, has again compressed the spring 15 under the action of the pressure applied from the conduit system 44 considered, this being effected rapidly by reason of the small volume to be displaced under the piston 31 as compared with the piston 13, the liquid under pressure can then act on the small piston 12.

From the moment at which the pressure existing in the conduit systems 25, 44 and 43, which correspond to the gearing ratio of the gear concerned, exceeds the value of that which obtains in the conduit system 19, which during this period has kept the clutch disengaged, the piston 12 in question acts directly or by pushing the other pistons 12 to cause the travel of the slide-valve 9 to be completed by causing the dished member 10 to abut against the shoulder 53.

In this position, as a result of the return movement of the piston 54 of the slide-valve 9, the chamber 49 puts the conduit system 47 into communication with the conduit 16, and the de-clutching cylinder 18 is thus put into connection with the return conduit system; the piston 17 expels the liquid, the clutch 20 is engaged and the lever 21 and the crank-arm 22 push back the piston 17. The re-engagement of the clutch can be carried out with smoothness by braking the return of the liquid through a throttle device 56 in the conduit system 16. The groove 46 of the slide-valve 9 puts the conduits 45 and 48 into free communication, and this maintains the pinions of the gear considered in engagement, since the whole pressure acts on the corresponding piston 31.

When changing from one gear to another, the pre-selector slide-valve 8 is displaced by rotation or by lateral movements, this having the effect of putting into communication with the exhaust conduit system 16 the conduit 25 which corresponds to the gear which has been changed, the return of the liquid being carried out by means of the cut-away portions 55 which are all connected to the general return system 16. When the pressure falls during the passage from a gear into neutral, it is the piston 12 which first moves back, pushed by the slide-valve 9 under the action of the spring 11.

This produces disengagement of the clutch; in fact, the process begins again, the groove 46 of the slide-valve 9 putting the pressure existing in the conduit 45 in communication with the conduit 19, the latter being coupled to the de-clutching cylinder 18; during this time, the return of the gear to the neutral position has taken place rapidly since the fluid exhaust is not restricted.

In the case of the return to the neutral position from a synchronised gear, the corresponding piston 13 is pushed back into the position of rest by the spring 15, and the fork spindle 27 returns to the neutral position under the action of the spring 32. The sections are determined in such manner that the return of the gears to the neutral position is completed before the admission of pressure to the new gear is effected.

In the case of a change of gear without synchroniser, the procedure is the same, but there are no elastic chambers, that is to say that there is no corresponding piston 15.

It would of course be possible to replace the manually-operated gear-selector 8 of the form of embodiment which has just been described, by an automatic selector which would render fully automatic all the gear-changing operations.

It will be observed that the invention provides, for the changing of synchronised gears, for the use of elastic chambers combined with a hydraulic resistance (a fine spiral conduit 59), in order that the pressure inside the conduit 25 may be caused to increase progressively for a given time, thus enabling the synchronisation of the speed of the pinions of the gear-box before they are engaged.

Elastic chambers have already been proposed for the actuation of gear-boxes, but their arrangement is such with relation to the other hydraulic control members, that these chambers are of necessity combined with a non-return valve system to provide for a slow rate of filling and a rapid exhaust, which is not necessary in the case of the combination proposed in the present invention, the resistance enabling slow filling to take place being located in front of the distributor and the exhaust being effected directly with practically no loss of pressure.

On the other hand, the chambers normally used are each provided with a spring, while with the proposed solution a single spring serves for any required number of chambers.

A further special feature resides in the design of the de-clutching distributor 9 which has the function of cutting-off the supply to the gear distributor 8 until the pressure in the de-clutching cylinder has reached the value which corresponds to complete disengagement.

A further characteristic point of the invention consists in the use of a series of small pistons 12 adapted to move in the same bore and on the same shaft as the de-clutching re-engaging slide-valve 9. These small pistons receive in turn, depending on the gear ratio chosen, the pressure transmitted to the cylinder which controls the fork spindle. When this pressure has exceeded the value necessary for the disengagement of the balls of the pinion-synchronising device, this small piston pushes the slide-valve 9 fully back, and this puts the de-clutching cylinder to exhaust. The clutch is then engaged.

The device for returning the fork spindles to the neutral position constitutes still a further special feature of the invention, a single spring serving to bring the fork spindle to the neutral position, irrespective of the direction of displacement of this latter, and, on the other hand, the force retaining it in the neutral position may be chosen to be of any particular value.

In the form of embodiment shown and described, the gear-changing device proposed is combined with an ordinary type of clutch controlled by a hydraulic cylinder. It could obviously be combined with all clutch systems, including an electric clutch. In this case, it would merely be necessary to utilise the movement of the slide-valve 9 to actuate the de-clutching or engagement contacts.

In order to limit the pressure which can arise in the hydraulic resistance 59, there may be provided in parallel with this resistance, a pressure-limiting valve so arranged that if the hydraulic resistance 59 gives rise to a back pressure which exceeds the desired value, the valve provides a direct passage for the liquid. Referring now to Fig. 5, it will be seen that in accordance with this alternative form, the hydraulic resistance constituted by a coiled conduit which was provided between the grooves 38 and 50 at the periphery of the jacket 7 has been eliminated and replaced by an external resistance 60, which may also consist of a coiled conduit; between the incoming and outgoing fluid conduits 61 and 62 is provided as a by-pass a device 63 having a pressure-limiting valve.

As shown in Fig. 6, this device 63 comprises a ball 64 forced against its seating by a piston 65 loaded by a suitably calibrated spring 66, the fluid coming in underneath the ball through the conduit 61 and passing out through the conduit 62 which opens into the internal chamber 67 which contains the ball, the piston and its spring.

It would also be possible to replace the hydraulic resistance 59 by a device for limiting the rate of flow, such as that shown in Figs. 7 and 8.

Referring now to the figures, the apparatus comprises essentially a hollow piston 71 or tubular body comprising one or a number of thin discs 72, each of which is pierced with a hole 73, the discs forming a succession of chambers which only communicate with each other through the orifices 73, but which permit a liquid to circulate from one end of the piston or tubular body to the other. The latter is contained in a body 74 formed with an inlet pipe 75 and an outlet pipe 76. In addition, a spring 77 is compressed by the piston when this moves in the direction of the arrow 78.

The operation is simple to understand: a fluid under pressure being admitted through the pipe 75, fills the whole of the interior of the apparatus and spring at 76, but its passage through the orifices 73 having a diameter $d$ creates a loss of pressure which, for the desired rate of flow $\varphi$ should have a value $\mu$. The spring 77 is calibrated in consequence so that its elastic reaction may be equal to $\mu$ when the piston comes partly over the outlet orifice 76 but without completely overlapping it.

Thus, supposing the piston to be completely to the right hand side in the cylinder and the pressure inside the tube 5 increasing from zero, for a certain pressure at 75, no matter what that pressure may be, the piston moves forward in the direction of the arrow 78, the flow passing through the orifices 73 creates a difference in pressure between the upstream part of the chamber of the apparatus (admission side) and the front portion (outlet side). This difference in pressure enables the piston to compress the spring 77, and when it reaches the value $\mu$, the piston occupies the position 79 shown in dotted lines. If this difference in pressure increases, the piston tends to close the outlet orifice. At this moment, the rate of flow tends to fall and thus also the loss of pressure which enabled the spring 77 to be compressed as far as that position.

It can be seen that the rate of flow cannot increase, even if the pressure increases, the difference in pressure which is transmitted to the spring 77, and which can only increase if the flow increases, being limited by the compression of the spring, the latter causing the flow to be cut-off whenever the piston tends to pass beyond the position 79.

On the other side, if the flow tends to fall, the spring pushes the piston to the right hand and the free section of the orifice 76 tends to grow up, reestablishing thereby the flow at the level requested.

A form of embodiment could also be provided, in which the piston and the orifices formed in thin partitions would constitute two different members. Thus, in Fig. 8, the partitions 82 are carried by a fixed cylinder 80, the extremities of which are in communication with the corresponding extremities of the cylinder 81 which contains the moving piston 84 controlled by the spring 83.

The difference in pressure between the upstream side and the downstream side, which difference regulates the position of the piston 84 and in consequence the flow, is produced by the passage of the liquid through the orifices.

The device in accordance with the invention enables a change of gear to be effected in a minimum time, with a perfect synchronisation of the pinions, independently of the driver, since all the operations: de-clutching, synchronisation, engagement and re-engagement of the clutch are carried out in a perfect chronological sequence, without dead-time spaces.

It would of course be possible to produce further alternative forms and modifications of the form of embodiment which has been shown, without thereby departing from the spirit or from the scope of the invention.

I claim:

1. For a vehicle having a clutch adapted for being disengaged by hydraulic power and a gear box including gears adapted for being driven through the intermediary of said clutch, a hydraulic gear-change control comprising: a source of hydraulic power adapted for being coupled to said clutch to provide power for disengagement of the latter, a master distributor coupled to said source for distributing the power and selecting a gear, a slide valve coupled between said source and said clutch for controlling the disengagement of said clutch, said slide valve being hydraulically coupled to said distributor, means defining a discharge conduit connected to said slide valve for enabling the re-engagement of said clutch after a gear is engaged, a plurality of double-acting piston and cylinder devices each coupled to one gear in the gear box, elastic means hydraulically coupled to the piston and cylinder devices, and a hydraulic resistance means in and connecting said distributor and one of said piston and cylinder devices for causing a delay in gear engagement during which the clutch is disengaged, said elastic means being further hydraulically coupled to said slide valve for controlling the connection of the lattter to the discharge port and thereby re-engagement of said clutch with the gear selected.

2. A device according to claim 1 comprising an auxiliary distributor coupled to the master distributor and including said slide valve, said auxiliary distributor being coupled to said source for enabling fluid under pressure to reach the master distributor only when the pressure has attained a predetermined value required for disengaging the clutch.

3. A device according to claim 2 comprising a plurality of supplemental pistons coaxially arranged with the slide valve of the auxiliary distributor, said supplement pistons operating to actuate the slide valve automatically when a gear change is completed.

4. A device according to claim 1, wherein the slide valve is displaced into a clutch engaging position by one of said pistons at a pressure which exceeds the pressure required for selection of a gear of the gear box, like faces of the supplemental pistons being put into association through the master distributor and a conduit system with a conduit through which pressure is supplied to the piston and cylinder device.

5. A device according to claim 1 wherein said elastic means comprises a plurality of pistons arranged in a common bore and loaded by a common spring.

6. A device according to claim 1 wherein the hydraulic resistance means comprises a narrow tube spirally arranged about the master distributor.

7. A device according to claim 6 wherein the hydraulic resistance means is arranged at the upstream side of the master distributor so that a return flow of the fluid through the resistance means is prevented.

8. A device according to claim 1 comprising forks for actuating pinions in said gear box sliding shafts supporting said forks, a pre-compressed spring urging said shafts into a predetermined position, and stop plates limiting the movement of said pre-compressed spring, said stop plates being supported by the shafts and bearings therefor.

9. A device according to claim 7 comprising a by-pass valve connected in parallel with the hydraulic resistance.

10. A device according to claim 1 wherein the hydraulic resistance means is a flow-limiting device.

11. A device according to claim 1 wherein the flow-limiting device comprises thin partitions disposed transversely in the path of the liquid, a flow regulating spring, and a movable piston supported against said flow regulating spring and the position of which is controlled by the difference in pressure created by flow openings defined by said flow-limiting device.

References Cited in the file of this patent

UNITED STATES PATENTS

| | | |
|---|---|---|
| 2,153,509 | Rockwell | Apr. 4, 1939 |
| 2,714,435 | D'Ozouville | Aug. 2, 1955 |
| 2,753,024 | Weaving et al. | July 3, 1956 |